(12) United States Patent
Ruan

(10) Patent No.: US 7,802,688 B1
(45) Date of Patent: Sep. 28, 2010

(54) CUTLERY SUPPORT

(76) Inventor: Ying Gang Ruan, 12014 W. 130th St., Overland Park, KS (US) 66213

( * ) Notice: Subject to any disclaimer, the term of this patent is extended or adjusted under 35 U.S.C. 154(b) by 112 days.

(21) Appl. No.: 12/020,451

(22) Filed: Jan. 25, 2008

(51) Int. Cl.
 *A47F 7/00* (2006.01)
(52) U.S. Cl. .............. 211/70.7; 248/37.3; 248/37.6
(58) Field of Classification Search ............. 248/37.3, 248/37.6; 211/70.7; 30/298.4
 See application file for complete search history.

(56) References Cited

U.S. PATENT DOCUMENTS

| | | | | |
|---|---|---|---|---|
| 1,946,779 | A * | 2/1934 | Conway | 248/37.3 |
| D159,185 | S * | 7/1950 | Case | D7/637 |
| 2,753,631 | A * | 7/1956 | Culver | 30/296.1 |
| 2,754,008 | A * | 7/1956 | Culver | 248/37.6 |
| 3,842,980 | A * | 10/1974 | Kushner | 248/205.3 |
| 4,071,212 | A * | 1/1978 | Burrows et al. | 248/37.6 |
| 4,082,386 | A * | 4/1978 | Beasley, Jr. | 312/204 |
| 4,561,548 | A * | 12/1985 | Call | 211/70.7 |
| 4,601,400 | A * | 7/1986 | Buchanan et al. | 211/70.7 |
| 4,970,006 | A * | 11/1990 | Martinez | 248/37.3 |
| D321,771 | S | 11/1991 | Cavicchia | |
| D383,273 | S | 9/1997 | Hampshire | |
| 5,725,108 | A * | 3/1998 | Olson | 211/70.7 |
| 6,058,609 | A * | 5/2000 | Yen et al. | 30/298.4 |
| 6,371,312 | B1 * | 4/2002 | Tsuchida | 211/70.7 |
| 6,659,406 | B2 * | 12/2003 | Tsuchida | 248/37.3 |
| 6,666,343 | B1 * | 12/2003 | Liu | 211/70.7 |
| 6,854,186 | B2 * | 2/2005 | Basden et al. | 30/298.4 |
| 7,204,374 | B2 * | 4/2007 | Marek | 211/70.6 |
| 7,267,238 | B2 * | 9/2007 | Yang et al. | 211/41.3 |
| D554,318 | S | 10/2007 | Yang et al. | |
| D555,311 | S | 11/2007 | Yang et al. | |
| D559,491 | S | 1/2008 | Yang et al. | |
| 2002/0014560 | A1 * | 2/2002 | Diamond | 248/37.3 |
| 2002/0175131 | A1 * | 11/2002 | Johnson | 211/70.7 |
| 2006/0091264 | A1 * | 5/2006 | Priestman et al. | 248/37.3 |
| 2009/0101607 | A1 * | 4/2009 | Zeng | 211/70.7 |

* cited by examiner

*Primary Examiner*—J. Allen Shriver, II
*Assistant Examiner*—Michael McDuffie
(74) *Attorney, Agent, or Firm*—Hovey Williams LLP

(57) ABSTRACT

A cutlery support includes first and second upright standards, a blade support, a handle support, and a plurality of separators defining an open area therebetween. Cutlery such as knives are placed on the cutlery support to engage the blade support and the handle support with the blade lying within the open area. The blade support is preferably configured with a blade stopper and cutting edge support, each of which engage the blade at only one point. Smaller pieces of cutlery, such as shears and small knives, may be carried by a cutlery receiver with their blades in an upright orientation lying within the open area. Additional knives having ferromagnetic blades may be held for temporary use by magnets in the upright standards. The standards, blade support, handle support and separators are preferably of a non-porous, transparent and corrosion-resistant material.

20 Claims, 4 Drawing Sheets

CUTLERY SUPPORT

BACKGROUND OF THE INVENTION

1. Field of the Invention

The present invention concerns a support for cutlery such as knives, kitchen shears, cleavers, sharpening steels and like utensils which supports the cutlery above a supporting surface with minimum contact and to promote cleanliness of the support. In addition, in preferred embodiments, the cutlery support hereof is intended to provide for air circulation to dry the blades of the cutlery after rinsing or cleaning, to keep the blades separated when carried on the support, to provide an ability to magnetically retain a blade of a knife for quick access, and to more readily view the cutlery during storage on the support.

2. Description of the Prior Art

In both home and commercial kitchens, knives are used during food preparation and it is important, if not essential, that the knives be kept clean to avoid contamination of other foods. This is for both reasons of health and taste.

Often, kitchen workers are confronted with problems as to how to store knives when not in use, even for a few moments. When knives are set down upon a surface, that surface must be cleaned as a result of contact with a knife. Where several different knives are used in food preparation, as is often the case in restaurants and the like, there is a tendency on the part of the kitchen worker to avoid cleaning between each use or to simply place the knife with the blade in contact with the surface. Alternatively, the knife may be placed back into a conventional knife rack, where any food residue on the knife can be transferred to the knife rack, and then back to the same knife or other knives returned to the same position. This can result in transfer of contamination from one knife to another and microbial build-up in the holder, which is often difficult to resolve. In addition, inspection authorities may issue citations where commercial kitchens fail to adhere to cleanliness standards.

SUMMARY OF THE INVENTION

The present invention overcomes these problems by providing a cutlery support which provides for a large open area where the knife blades are retained but with minimal contact between the knife blades and the cutlery support. The knife holder is designed to provide ease of use in order to promote the retrieval and return of the cutlery by kitchen staff, as opposed to resting the knives even temporarily on the surface. Moreover, the cutlery support hereof is easy to clean, and in preferred embodiments, aids the user in seeing any food or other contaminant build up on the support. In addition, the cutlery support hereof aids in maintaining separation of the blades of adjacent knives, with the additional benefit of providing for magnetic retention of ferromagnetic blades where temporary support is desired by the user. Beneficially, the cutlery support hereof is easy to clean, while permitting visual observation of the blades of the knives held therein, and protects the supported cutlery from dislodgment.

Broadly speaking, the cutlery support of the present invention includes first and second spaced-apart upright standards, a handle support and a blade support which extend between and are supported by the standards above the supporting surface, with an open area generally interior to the standards, handle support and blade support. The blade support is configured to provide minimal contact, preferably only a single point or two points of contact with knife blades having their handles resting upon the handle support. The blade support may also include a blade stopper positioned adjacent a cutting edge support where the length of a knife would otherwise cause the knife to slide over the cutting edge support. In this way, the knife blade has a minimal amount of contact with the cutlery support to thereby avoid transferring any food particles from the blade to the cutlery support. Further, the large open area facilitates cleaning of the cutlery support.

The preferred embodiment of the cutlery support provides additional advantageous features. A plurality of separators extending generally parallel to the upright standards. The separators are readily cleaned, but may be useful in maintaining spaced separation between the blades of adjacent knives. In addition, one or a plurality of transverse supports be provided adjacent, and most preferably parallel to, the separators, whereby small knives such as paring knives or kitchen shears may be supported with their handles extending in a generally vertical orientation and maintained above the transverse supports which permit the blades, but not the handles, of such cutlery, to pass therethrough. In particularly preferred embodiments, the upright standards are provided with one or a plurality of magnetic bodies embedded within one or both of the standards. The magnetic bodies help to retain blades of ferromagnetic material of knives above a surface when the user wishes to temporarily "park" a knife without placing it inside the cutlery support. In addition, the cutlery support may be constructed of a transparent material which facilitates the ability of the user to see both the particular knife blade desired as well as any food particles left on the support which needs to be removed and cleaned.

These and other advantages will be readily apparent to one skilled in the art after reviewing the drawings and description as set forth herein.

DESCRIPTION OF THE PREFERRED EMBODIMENT

Figures 1, 2:
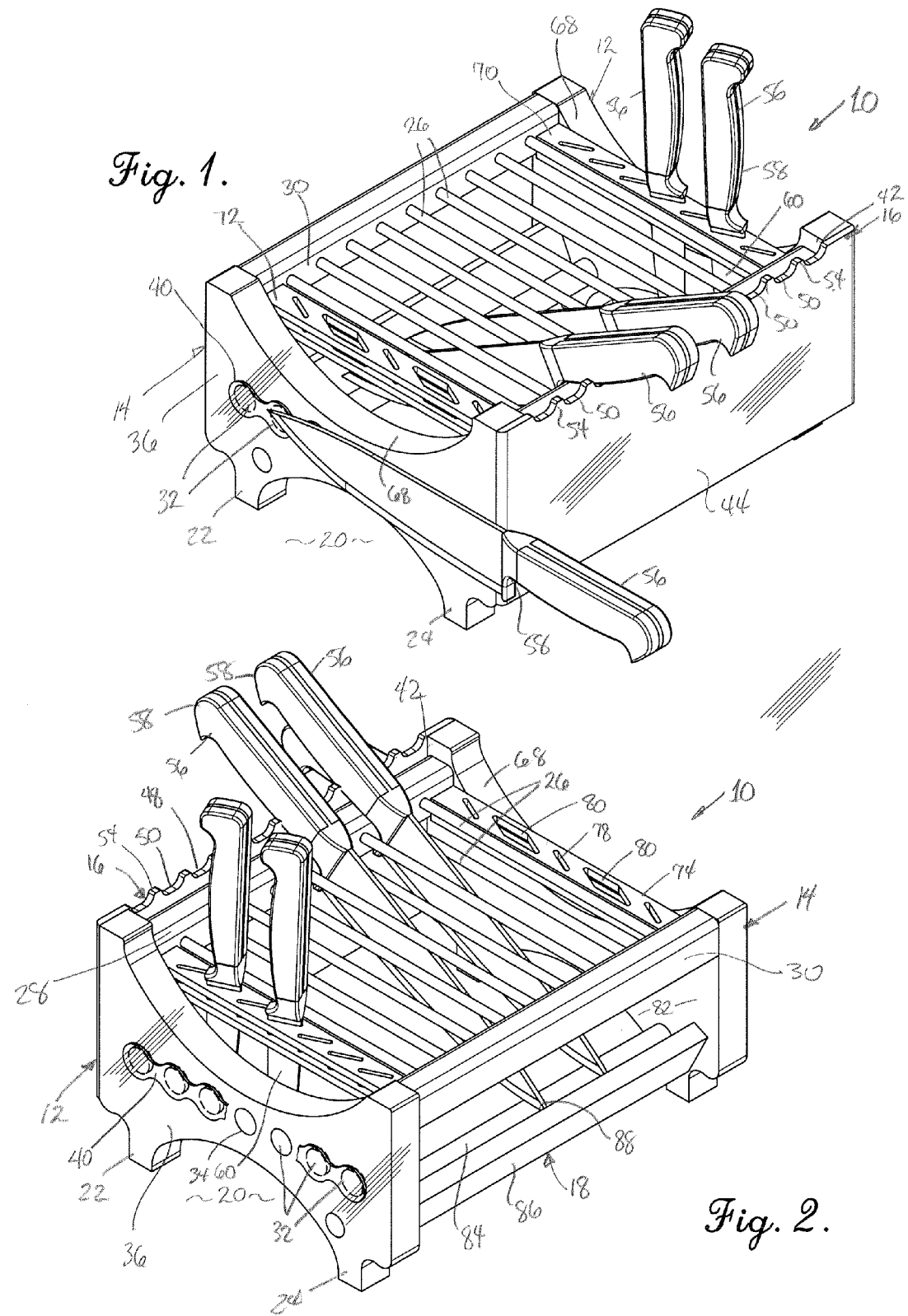
FIG. 1 is a top front left perspective view of the cutlery support of the present invention showing knives supported thereon in three different manners.
FIG. 2 is a top rear right perspective view of the cutlery support similar to FIG. 1, but with portions of a shield over the magnetic bodies embedded in the upright standards broken away.

Referring now to the drawing, a cutlery support 10 in accordance with the present invention broadly includes first and second upright standards 12 and 14, a handle support 16 and a blade support 18. The handle support 16 and the blade support 18 are mounted, by adhesive, heat or chemical welding, or by fasteners to the upright standards 12 and 14 whereby they are spaced from and above a supporting surface 20 on which the legs 22 and 24 of each of the standards rest. A plurality of elongated separators 26 are provided to extend substantially perpendicular to the handle support and blade support and parallel to the upright standards 12 and 14. First and second transverse supports 28 and 30 are mounted to extend substantially perpendicular to upright standards 12 and 14. At least one, or preferably both of the upright standards 12 and 14 have embedded magnetic bodies 32 therein.

Figure 7:
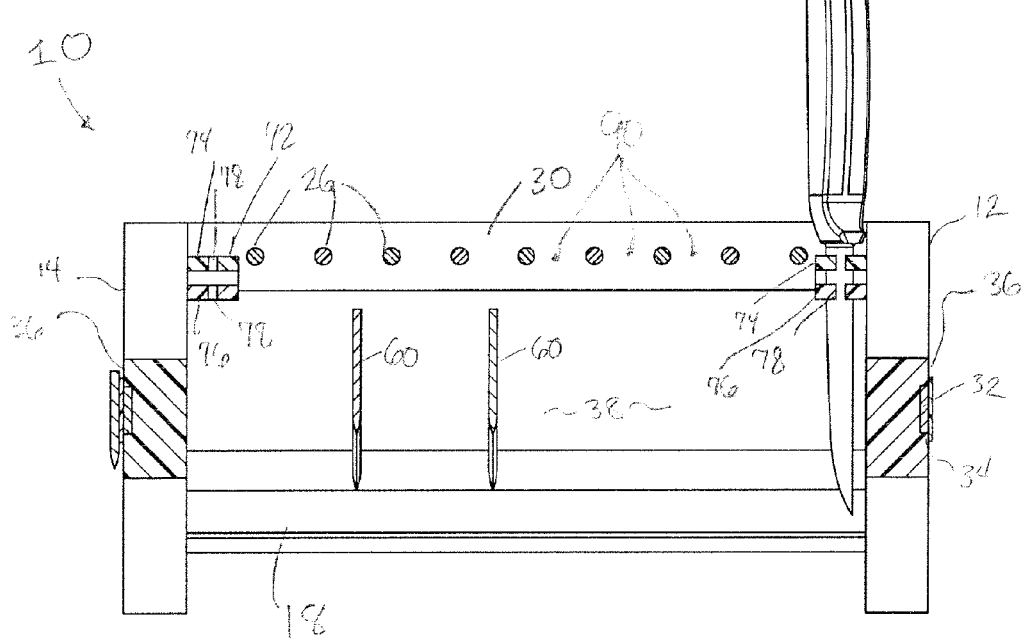
FIG. 7 is a vertical cross-sectional view taken along line 7-7 of FIG. 5 showing the relative positions of the blades of various knives when carried by the cutlery support hereof.

In greater detail, the upright standards are configured to extend upwardly from a supporting surface 20 and are substantially parallel to one another. The upright standards 12 and 14 each are provided with a plurality of cavities 34 which are arranged in substantially linear alignment along the standards 12 and 14 and spaced upwardly by the legs 22 and 24 from the supporting surface. The cavities 34, shown a circular but which may be of any configuration, are preferably oriented with an opening facing outwardly to an outboard surface 36 of each of the standards and thus away from the open area 38 as illustrated in FIG. 7 to receive the magnetic bodies 32 therein. The cavities, and thus the bodies 32, are covered by a shield 40 which is most preferably transparent and constructed of a material resistant to corrosion, for example acrylic or other synthetic resin material. The shield is configured and mounted to cover the cavities and the magnetic bodies 32 received therein so as to resist the entry of liquid or vapor which would corrode the bodies 32 during cleaning. The standards 12 and 14 are also preferably manufactured of a non-porous corrosion-resistant material such as a synthetic resin, for example an acrylic, and most preferably of a transparent material which aids both in viewing the cleanliness of the cutlery support as well as for viewing any knives or other cutlery supported thereon.

The handle support 16 is also preferably manufactured of a non-porous, corrosion-resistant material such as a synthetic resin, and most preferably a transparent acrylic material. The handle support 16 is mounted to extend transversely to the upright standards 12 and 14 and is positioned at one side 42 of the standards. The handle support most preferably includes a transverse wall 44 and in a most preferred embodiment one of the transverse supports 28. The handle support 16 preferably includes a handle cradle 48 as a part of the transverse wall and is provided by a plurality of recesses 50 sized and positioned to receive the handles of knives 58 or the like. When the recesses 50 are provided in the transverse wall 44 as shown, for example, in FIGS. 1 and 3, tabs 54 are provided to alternate with the recesses 50 and extend upwardly from the recesses 50, thereby being positioned between the recesses 50 to serve to retain the handles 56 of the knives 58 therebetween. In addition, the tabs 54 are aligned with the elongated separators 26 whereby the blades 60 of the knives 58 are positioned between the separators 26. The handle support 16, including the transverse wall 44 and transverse support 28, are preferably made of a non-porous corrosion-resistant material such as, for example a synthetic resin material. An acrylic resin, and in particular a transparent resin, is particularly useful in the present invention.

Figure 4:
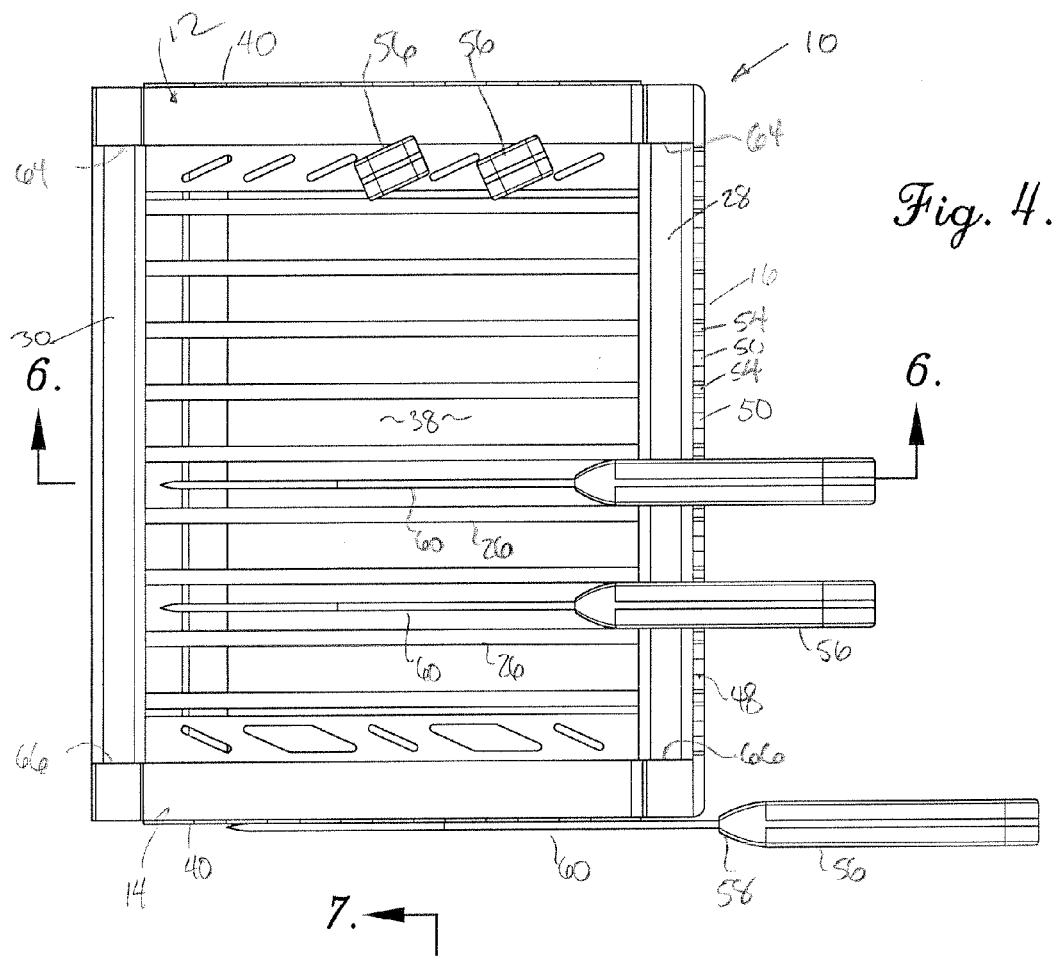
FIG. 4 is a top plan view showing transverse supports extending parallel to separators for the blades and presenting openings configured to receive both knives and shears.
Figure 5:
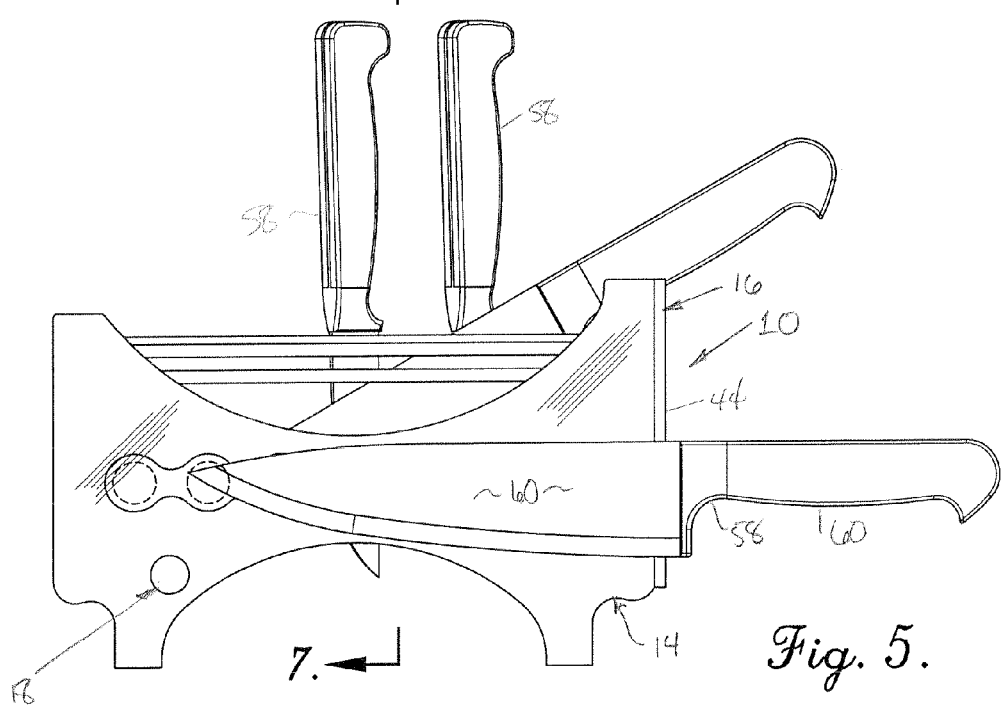
FIG. 5 is a left side elevational view of the cutlery support showing the orientation of the handles when knives are held in the transverse supports, in the cradle of the handle support, and when held by the embedded magnets in the upright standards.

Transverse supports 28 and 30 are preferably mounted to and extend between the upright standards 12 and 14. Transverse support 28 may provide additional support for handles resting thereon and may be incorporated into the handle support, and transverse support 30 is positioned opposite the handle support 16. The transverse support 30 is mounted by adhesive, thermal or chemical welding, fasteners or the like to the upright standards and is generally parallel to and spaced apart from the handle support. As seen best in FIG. 4, the transverse supports 28 and 30 are positioned at the side margins 64 and 66 of each of the upright standards 12 and 14 and proximate top margins 68 thereof. Most preferably, the transverse supports 28 and 30 lie in a substantially common horizontal plane and are provided with a plurality of evenly spaced, opposing cavities which are aligned to receive the ends of the separators 26 therein. The separators 26 are preferably configured as elongated rods of a non-porous corrosion-resistant material such as synthetic resin, for example acrylic, which are then received in the opposing cavities of the transverse supports 28 and 30. The separators 26 are thereby maintained in substantially parallel alignment with respect to one another, perpendicular to the handle support 16 and the blade support 18, and substantially co-planar with respect to each other. Most preferably, the upright standards 12 and 14 are provided with top margin 68 which is configured such that at least a portion, and most preferably a majority of the longitudinal length of the separators 26 are positioned above the top margin 68 to provide improved air circulation to the open area 38 for drying the separators and the blades of the cutlery positioned therebetween. The upright standards also include a bottom margin 62 which is configured to be elevated upwardly above the supporting surface by legs 22 and 24 and so as to provide improved air circulation to the open area 38.

The preferred embodiment also includes two substantially parallel, spaced-apart transverse cutlery receivers 70 and 72. Each of the cutlery receivers 70 and 72 lies parallel to and adjacent a respective upright standard 12 and 14, and like the separators 26, most preferably a majority of the longitudinal length of the cutlery receivers is positioned above the top margin 68 of the upright standards to promote air circulation. The cutlery receivers 70 and 72 are preferably configured as a pair of substantially parallel bars 74 and 76 which are parallel to one another, superposed and spaced vertically with respect to one another, each having one or a plurality of slots 78. The spacing between the bars 74 and 76 helps to allow air circulation therein and to the open area 38 from air entering the open area 38 over the top margin 68. The slots 78 of the lower bar 74 are in registry with the slots 78 of the upper bar, and complementally configured so that the blades 60 of knives 58, such as paring knives or the like, may be received therein, but the handles 56 of such knives are blocked from passage as shown in FIGS. 1, 2, 4 and 5. Some of the slots 80 may have an alternate configuration capable of holding kitchen shears or the like, and thus slots 80 are diamond shaped rather than of a narrow rectangular shape as is the case with slots 78. The alignment of the slots and the spacing between the bars 74 and 76 are provided so as to facilitate cleaning between the bars but to maintain the knives 58 supported on the cutlery receivers in substantially vertical orientation.

Figure 3:
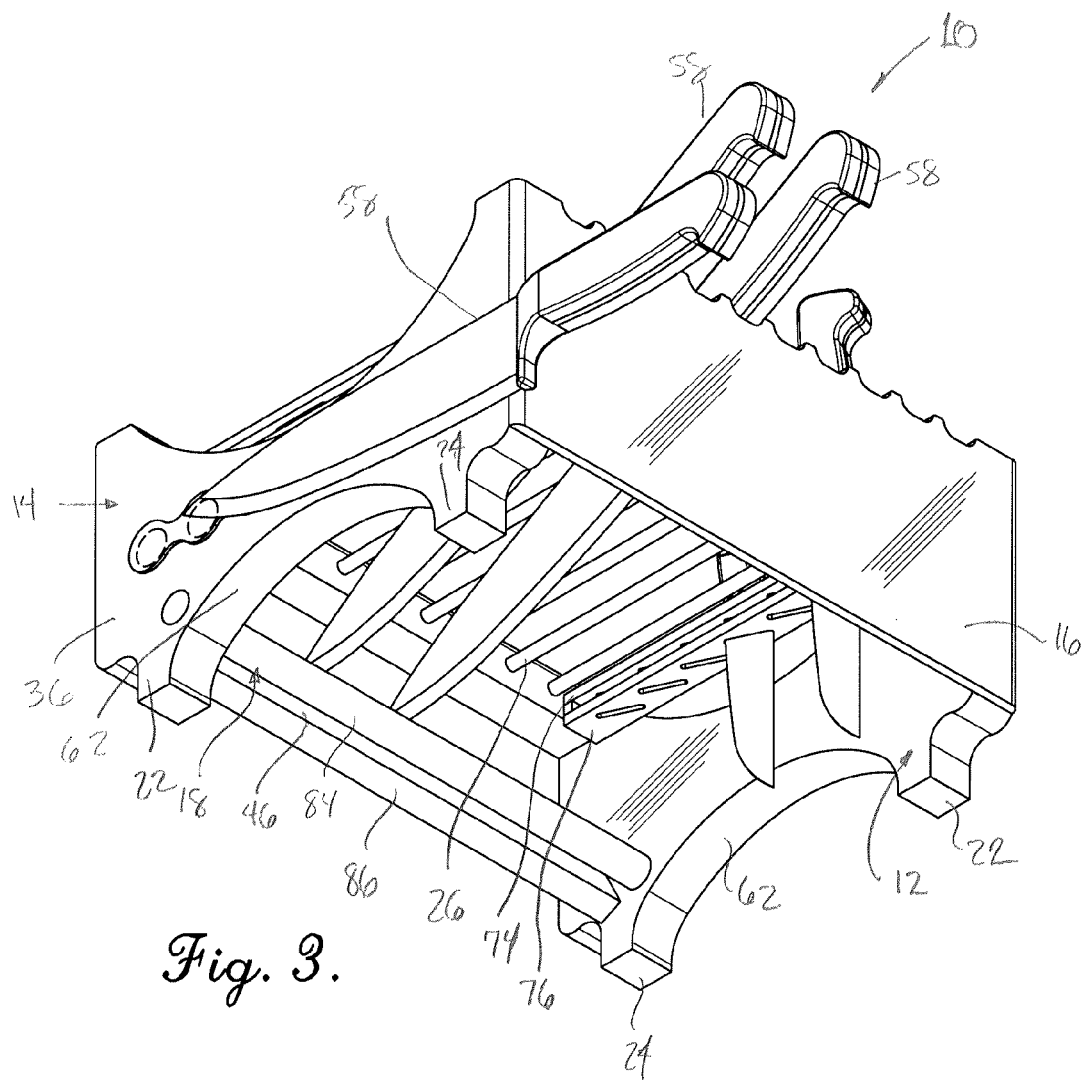
FIG. 3 is a bottom front left perspective view of the cutlery support hereof, showing the open area between the standards and also the blade stopper and cutting edge support extending between the upright standards.
Figure 6:
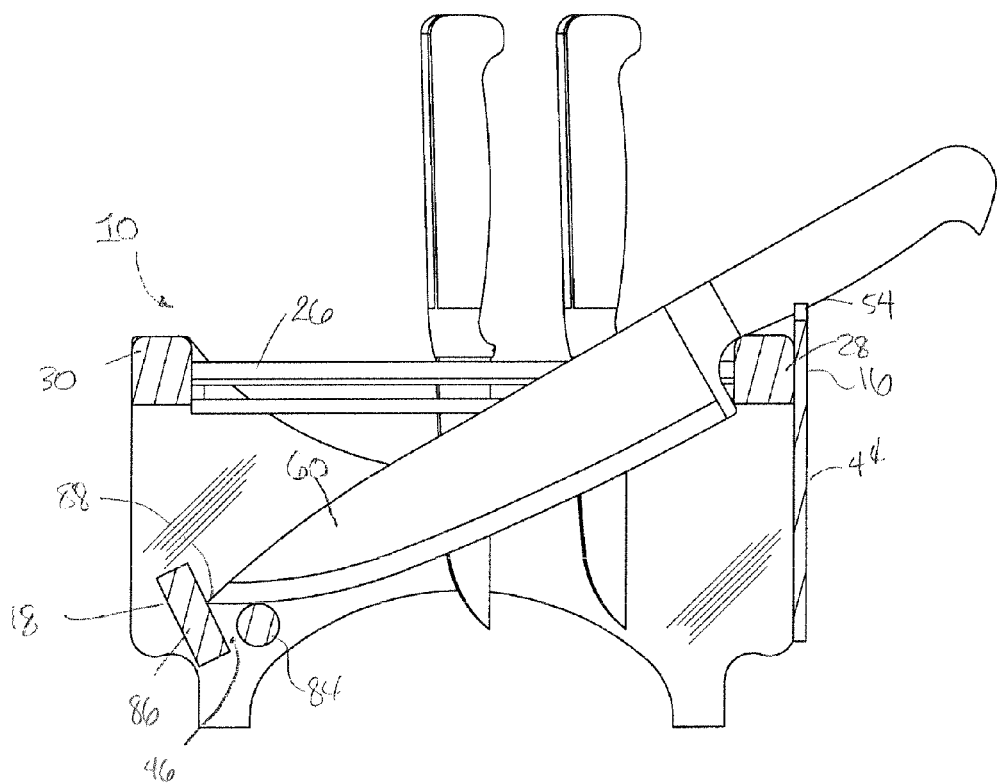
FIG. 6 is a vertical cross-sectional view taken along line 6-6 of FIG. 4 showing the handle of a knife resting in a cradle of the handle support and the blade stopper and cutting edge support supporting the blade of the knife above a supporting surface.

The blade support 18 is mounted to the upright standards 12 and 14 so as to be positioned above the supporting surface. The blade support 18 is also preferably of a non-porous corrosion-resistant material. Synthetic resin, and in particular transparent acrylic, is one material suitable for use in the blade support 18. The blade support 18 is preferably elongated to extend between the upright standards 12 and 14 and presents an opening 82 between the blade support 18 and the transverse support 30 to promote air circulation. The blade support 18 preferably includes a cutting edge support 84 and a blade stopper 86 which is parallel to and spaced apart from the cutting edge support 84 to provide a gap 46 therebetween, as seen in FIGS. 3 and 6. The cutting edge support 84 is configured to present a substantially single point of contact between it and the blades 60 of knives 58 resting thereon. In particularly preferred embodiments, the cutting edge support 84 has an arcuate surface and most preferably circular in cross-section as seen in FIG. 6. The blade stopper 86 is mounted to engage the tip 88 of blades 60 as shown in FIG. 6, again presenting a substantially single point of contact with blades 60. The blade stopper 86 is oriented to prevent a knife received in the cutlery support 10 from slipping forwardly and off of the cutting edge support 84, and thus is preferably angled with respect to a vertical plane as seen in FIG. 6.

The cutlery support 10 is thus provided with a substantially open area 38 bounded by the upright standards 12 and 14, the handle support 16 and the blade support 18, with the separators 26 positioned above the open area 38 but presenting passages 90 therebetween as shown in FIG. 7 to receive the blades 60 and permit air circulation. Circulation of air to the open area 38 is further promoted by the opening 82, and the access for air circulation below the bottom margins of upright standards 12 and 14 and over the top margins of the upright standards 12 and 14. While air is permitted to circulate into the open area 38, entry of large pieces of food or other debris are inhibited by the upright standards 12 and 14, the transverse wall 44, and the blade stopper 86. Thus, the cutlery support provides a good compromise between air circulation and the need to protect the user from the blades 60 and to protect the blades 60 within the open area 38 from contamination, both with respect to knives 58 having handles resting on the cutlery receivers 70 and 72 as well as the knives 58 with handles located in the recesses 50.

In use, knives 58 may be stored by placing their handles 56 on the handle support 16 with the blades 60 separated by separators 26, the blades 60 resting on the cutting edge support 84 and the tips 88 engaging the blade stopper 86. It is to be understood that the cutting edge support and the blade stopper are constructed of synthetic resin material which is substantially smooth and of sufficient hardness so as not to absorb the blade and tip in a cushioning manner, but rather that the materials of the cutting edge support and tip will resist penetration. For knives 58 with shorter blades, or cutting shears or the like, such shorter knives or shears may be stored by placement in an upright orientation as shown in FIGS. 1 and 2 in the cutlery receivers 70 and 72. When a knife is in use, but to be temporarily stored above the supporting surface, its blade may be magnetically held by magnetic bodies 32 with the blade thereof extending along a substantially horizontal axis above the supporting surface as shown in the drawing figures. Because the magnets are covered by the shield, the surface of the upright standard on which the knife rests can be readily cleaned. Moreover, the use of a substantially transparent material aids in keeping the cutlery support 10 clean, as food particles or other debris may be more readily seen, not only on the exterior but also on the portions of the cutlery support facing the interior, open area 38 as well. The cutlery support, being substantially open with accessible surfaces, can be readily cleaned by brushing, immersion, passage through a commercial dishwashing machine or hand spray.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

The invention claimed is:

1. A cutlery support for carrying cutlery above a surface, the cutlery having a handle and a blade with a cutting edge and a tip, the support comprising: first and second spaced-apart upright standards each having a bottom portion positioned for resting on the surface, said upright standards defining therebetween a substantially open region; an elongated handle support mounted to and extending between said standards upwardly of said bottom portion, said handle support including a plurality of handle cradles spaced longitudinally therealong; and an elongated blade support mounted to and extending between said standards, said blade support being oriented substantially parallel to, opposite from and spaced apart from said handle support, said blade support comprising: a blade stopper oriented opposite said handle support, and an elongated blade rest oriented substantially parallel to said blade stopper and having an upper ridge positioned lower than said handle cradles, said blade support being configured and positioned generally between said handle cradles and said blade stopper such that when cutlery is supported by the cutlery support, the handle is received in one of said handle cradles with the edge resting on said upper ridge and said tip engaged by said blade stopper.

2. The cutlery support of claim 1, wherein said blade stopper and said cutting edge support are spaced apart, defining a gap therebetween.

3. The cutlery support of claim 1, further comprising at least one magnet mounted to at least one of said upright standards and positioned for magnetically holding cutlery having a ferromagnetic blade above and in spaced relationship to the surface.

4. The cutlery support of claim 3, wherein at least one of said upright standards comprises a cavity receiving said at least one magnet therein, and an outer-facing covering over said cavity and said at least one magnet.

5. The cutlery support of claim 1, further including a first transverse support mounted in transverse orientation to said first and second upright standards and positioned above said blade support.

6. The cutlery support of claim 5, further comprising a plurality of separators mounted to and extending from said first transverse support to said handle support above said open region for maintaining separation between the blades of adjacent cutlery received on said handle support.

7. The cutlery support of claim 5, further comprising at least one cutlery receiver extending between said handle support and said first transverse support and lying adjacent one of said upright standards and disposed above said open are and in spaced relation to the surface, said cutlery receiver including structure defining at least one slot therein for supporting cutlery thereon in a substantially upright orientation.

8. The cutlery support of claim 7, said cutlery receiver including a pair of spaced bars arranged in substantially parallel orientation, each of said bars having respective slots arranged in substantially vertical registry.

9. The cutlery support of claim 7, wherein said cutlery receiver includes a plurality of said slots, at least one of said plurality of slots differing in shape from another of said slots.

10. The cutlery support of claim 1, wherein at least the upright standards, the handle support and the blade support comprise synthetic resin material.

11. The cutlery support of claim 10, wherein the synthetic resin material is substantially transparent.

12. The cutlery support of claim 1, wherein the cutting edge support has an arcuate surface.

13. The cutlery support of claim 1, including a plurality of elongated separators extending substantially parallel to said upright standards, and wherein the handle support presents a plurality of alternating recesses and upright extensions, the upright extensions being aligned with said elongated separators.

14. A cutlery support for carrying cutlery having a handle and a blade above a surface, the support comprising:
   first and second spaced-apart upright standards, at least one of said standards including a cavity and having an upright, substantially planar outer-facing surface covering said cavity;
   connecting structure extending between said standards, said connecting structure including a plurality of handle cradles adapted to receive the handle thereon and blade support structure for supporting the blade above a surface; and
   at least one magnet located in said cavity and covered by said outer-facing surface and positioned for magnetically holding cutlery having a ferromagnetic blade above and in spaced relationship to the surface.

15. The cutlery support of claim 14, further comprising a plurality of cavities longitudinally spaced within said at least one of said standards, each of said plurality of cavities receiving a respective magnet therein.

16. The cutlery support of claim 15, wherein said outer facing surface is substantially planar and extends across a plurality of said cavities and corresponding magnets whereby a ferromagnetic blade may be placed against said outer-facing surface and magnetically supported by the magnets received in the plurality of cavities.

17. The cutlery support of claim 16, further comprising a cutlery receiver having a pair of spaced, substantially parallel bars each presenting a plurality of aligned cutlery-receiving slots therein mounted to and extending between said connecting structure and oriented substantially parallel to and adjacent one of said first and second standards.

18. A method of storing cutlery above a surface, the cutlery having a handle and a blade with a cutting edge and a tip, the method comprising:
   providing a cutlery support having first and second spaced upright standards configured for resting upon the surface, a handle support having handle cradles extending between the upright standards, a plurality of separators, and a blade support extending between the upright standards and positioned in spaced relationship to said handle support;
   inserting the blade between two separators,
   engaging the blade with the blade support at substantially only one point on the cutting edge; and
   engaging the tip of the blade with the blade stopper at substantially only one point thereon.

19. The method of claim 18, wherein the cutlery support includes at least one magnet received within at least one of said upright standards, and including placing a ferromagnetic blade of a cutlery member against the at least one of said upright standards in sufficient proximity to the magnet to retain the ferromagnetic blade against the upright standard in spaced relationship to the surface.

20. The method of claim 19, further comprising the step of providing a cutlery receiver component of said cutlery support, said cutlery receiver including at least one blade-receiving slot therein, and the step of placing a blade of a cutlery member through the slot whereby the blade extends through the slot but the handle is supported on the cutlery receiver in an upright orientation in spaced relationship to the surface and within an open area defined between the upright standards.

\* \* \* \* \*